United States Patent Office 3,295,920
Patented Jan. 3, 1967

3,295,920
RECOVERY OF LITHIUM FROM LITHIUM-BEARING ORES
Robert D. Goodenough, Giffin D. Jones, and Robert E. Anderson, Midland, Mich., assignors to The Dow Chemical Company, Midland, Mich., a corporation of Delaware
No Drawing. Filed Apr. 1, 1963, Ser. No. 269,703
16 Claims. (Cl. 23—50)

This invention relates to a method for the recovery of lithium value from lithium-bearing ores, and more particularly to a method for the recovery of lithium value by means of a strongly acidic cation exchange resin.

Methods for the recovery of lithium from acid-leachable ores by means of a strongly acidic cation exchange resin have been proposed in U.S. Patents 2,980,498 and 2,980,499. In the methods therein proposed, a lithium-containing ore, in acid-leachable form, is contacted, in the presence of water, with a strongly acidic cation exchange resin. Lithium value may then be obtained by separating the resin from the ore gangue and eluting the lithium value from the resin.

One of the main problems encountered in using the method disclosed in U.S. Patents 2,980,498 and 2,980,499 is the requirement of substantial amounts of time to accomplish the desired degree of extraction from the ore. Eight hours or more are usually required in order to get as much as 70 percent extraction and recovery of the lithium value from the ore.

It is an object of this invention to provide a method whereby substantial amounts of lithium may be recovered in an amount of time considerably less than the eight or more hours usually required by the previously known methods. Other objects will become apparent hereinafter.

The objects and advantages of the present invention may be accomplished by contacting, in the presence of an aqueous solution of acetic or propionic acid, a lithium-bearing ore in acid-leachable form with a strongly acidic cation exchange resin in the acid form thereby to load the resin with lithium ion by ion exchange. After sufficient time for ion exchange has elapsed, the lithium ion-containing resin may be separated from the ore gangue and lithium values recovered by eluting the resin with an electrolyte, such as hydrochloric acid, nitric acid, sodium or potassium salts, sodium or potassium hydroxide, or the like, depending on the lithium salt or compound desired.

Suitable ores for the method of the present invention are those which contain lithium in a form which is soluble in acid. Particularly, beta-spodumene, lepidolite, and pollucite are appropriate for treatment by the present method. Pretreatment of the ores may be accomplished in accordance with the procedures outlined in the previously discussed patents, if necessary or desired. For best results, ore having a size of from about 100 to about 200 mesh is preferred.

Appropriate ion exchange resins are the strongly acidic cation exchange resins. The sulfonic acid type cation exchange resins such as described in U.S. Patents 2,597,438, 2,500,149, and 2,366,007 are particularly suitable for use in the present invention.

Aqueous solutions containing from about 10 to about 80 percent by weight acetic or propionic acid are appropriate for use in the present invention with aqueous solutions containing from about 20 to about 60 percent by weight acetic or propionic acid being preferred. A substantially higher degree of extraction and recovery of lithium ion in a given time may be obtained with aqueous acetic or propionic acid solutions within the prescribed limits than may be obtained with either pure water, pure acetic acid or pure propionic acid in a comparable amount of time.

Temperatures appropriately used in the method of present invention are from about 90 to about 150 degrees centigrade, with temperatures of from about 100 to about 150 degrees centigrade being preferred. At temperatures of less than about 90 degrees centigrade, the rate of ion exchange is very slow. At temperatures above about 150 degrees centigrade, the ion exchange resin may tend to become unstable.

Pressure may be employed as necessary to maintain the aqueous acid solution in liquid form.

When the method of the present invention is employed, recovery of lithium ion in excess of about 85 percent may be obtained at about 150 degrees centigrade with a contact time of about one-half an hour. This compares with a contact time of 2 hours required to give a recovery of about 66 percent lithium ion when the method of U.S. Patents 2,980,498 and 2,980,499 is employed at the same temperature. It is to be noted that not all of the total available lithium in a given ore is necessarily in acid soluble form. Ordinarily, about 95 percent of the available lithium is in the acid soluble form necessary for the present method. This figure varies, of course, between different lithium-containing ores and between different samples of a given lithium-containing ore.

Further, when the method of the present invention is employed, good selectivity of lithium in preference to other metallic ore constituents is obtained. Thus, in addition to the other advantages of the present method, lithium values are obtained in high purity.

Approximately twice as much lithium ion may be recovered from the ore in a given amount of contact time (less than about six hours) and a particular temperature using the method of the present invention as may be recovered by the method proposed in U.S. Patent 2,980,499 where pure water rather than aqueous acetic or propionic acid was used as an ion transport medium.

If desired, a further improvement may be made in the present invention. The ore to be treated may be positioned in one container, the resin in another. Aqueous acetic or propionic acid of the desired concentration (from about 10 to about 80 and preferably from about 20 to about 60 percent by weight of acid) may then be run first through the ore, then through the ion exchange resin. In this manner, the problem of separating the resin from the ore after ion exchange is avoided. Further, loss of resin due to attrition may in this way be substantially eliminated. If desired, the aqueous acetic or propionic acid may be first continuously cycled first through the ore then through the ion exchange resin until the desired recovery is obtained. This type of procedure ordinarily results in a high degree of lithium extraction and recovery, as well as a lowering of the amount of total acid required for the system, with a resultant high operational efficiency. This particular application of the present method is totally unexpected since a cycling of pure water first through the ore, then through the ion exchange resin results in practically no lithium recovery whatsoever.

A better understanding of the present invention may be obtained in light of the following examples which are set forth to illustrate and are not to be construed to limit the present invention.

*Example 1*

In order to compare the extraction of lithium from beta-spodumene ore using the method of the present invention with known methods, a series of experiments was carried out using beta-spodumene ore which analyzed 6.41 percent lithium oxide. After grinding the ore to about 200 mesh size, a sample of the ore was contacted with 30 percent aqueous acetic acid in the presence of a strongly acidic cation exchange resin. Another sample of the same ore was contacted with the same kind of strongly acidic cation exchange resin in the presence of pure water. In each case, an amount of resin capable of holding twice the amount of available lithium ion was employed. The results obtained at a temperature of about 150 degrees centigrade indicated that in 20 minutes of contact time about 88 percent of the available lithium had been extracted from the ore by the use of aqueous acetic acid, whereas in the same amount of time about 20 percent of the available lithium had been extracted by the water-resin method. After about two hours at 150 degrees centigrade, the aqueous acetic acid method resulted in the recovery of about 89 percent of the lithium from the ore whereas the water-resin method resulted in recovery of about 67 percent of the available lithium. It may be readily seen that the process of the present invention is highly desirable since at 20 minutes of contact time more lithium value had been recovered using aqueous acetic acid than was recoverable by the water-resin method over a matter of about two hours.

For comparison, a similar experiment was performed at a temperature of about 100 degrees centigrade using a 30 percent aqueous acetic acid solution with a strongly acidic cation exchange resin and samples of the same ore used above. A two hour contact time resulted in the recovery of about 45 percent of the available lithium ion. At 100 degrees centigrade, the water-resin method resulted in a recovery of only about 20 percent of the available lithium ion.

Where necessary to maintain the aqueous acid in liquid form, pressurized equipment was employed.

Lepidolite and pollucite may be treated in substantially the manner set forth above for beta-spodumene with a comparable recovery of lithium value.

When propionic acid or mixtures of propionic with acetic acid are substituted for the acetic acid in the foregoing Example 1, lithium values will be recovered in substantially the same degree.

*Example 2*

A pair of separate containers are filled with acid leachable, lithium-containing ore such as beta-spodumene, and lepidolite or pollucite, and a strongly acidic cation exchange resin, respectively. Aqueous acetic acid of from about 10 to about 80, and preferably from about 20 to about 60 percent strength is then allowed to contact the ore thereby leaching lithium ion from the ore. The leachate thus obtained may then be run into the resin container to contact the resin and accomplish ion exchange. If desired, the aqueous acetic acid solution, stripped of lithium ion by the resin, is then again contacted with the ore to accomplish further leaching. This procedure is continued as desired until maximum removal of lithium ion from the ore, with subsequent loading of said lithium ion on the resin, is accomplished.

Where necessary to maintain the aqueous acid in liquid form, pressurized equipment is employed.

When the resin has been loaded with lithium ion, lithium values are recovered by eluting the resin with an electrolyte to form a solution containing the desired lithium salt or compound.

When this procedure is employed, at operating temperatures of from about 90 to about 150 degrees centigrade, recovery of as much as 90 percent or more of the available lithium ion may be accomplished in as little as four hours of ore treatment time.

When propionic acid or mixtures of propionic with acetic acid are substituted for the acetic acid in the foregoing Example 2, lithium values will be recovered in substantially the same degree.

Various modifications may be made in the present invention without departing from the spirit or scope thereof, and it is to be understood that we limit ourselves only as defined in the appended claims.

We claim:

1. In a method of recovering lithium values from a lithium-bearing ore containing lithium in an acid-leachable form which includes contacting the solid ore, in the presence of water while maintaining a temperature of from about 90 to about 150 degrees centigrade with a strongly acidic cationic exchange resin, subsequently separating the resin from the ore and recovering lithium values from the resin, the improvement which comprises contacting said ore with said strongly acidic cation exchange resin in the presence of an aqueous solution containing from about 10 to about 80 percent by weight of an acid selected from the group consisting of acetic and propionic acids.

2. In a method of recovering lithium values from a lithium-bearing ore containing lithium in an acid-leachable form which includes contacting the solid ore, in the presence of water while maintaining a temperature of from about 90 to 150 degrees centigrade, with a strongly acidic cation exchange resin, subsequently separating the resin from the ore and recovering lithium values from the resin, the improvement which comprises contacting said ore with said strongly acidic cation exchange resin in the presence of an aqueous solution containing from about 20 to about 60 percent by weight of an acid selected from the group consisting of acetic and propionic acids.

3. In a method of recovering lithium values from a lithium-bearing ore containing lithium in an acid-leachable form which includes contacting the solid ore, in the presence of water while maintaining a temperature of from about 90 to about 150 degrees centigrade with a strongly acidic cationic exchange resin, subsequently separating the resin from the ore and recovering lithium values from the resin, the improvement which comprises contacting said ore with said strongly acidic cation exchange resin in the presence of an aqueous solution containing from about 10 to about 80 percent by weight of acetic acid.

4. In a method of recovering lithium values from a lithium-bearing ore containing lithium in an acid-leachable form which includes contacting the solid ore, in the presence of water while maintaining a temperature of from about 90 to about 150 degrees centigrade with a strongly acidic cationic exchange resin, subsequently separating the resin from the ore and recovering lithium values from the resin, the improvement which comprises contacting said ore with said strongly acidic cation exchange resin in the presence of an aqueous solution containing from about 10 to about 80 percent by weight of propionic acid.

5. In a method of recovering lithium values from beta-spodumene ore which includes contacting the solid ore, in the presence of water while maintaining a temperature of from about 90 to about 150 degrees centigrade, with a strongly acidic cationic exchange resin, subsequently separating the resin from the ore and recovering lithium values from the resin, the improvement which comprises contacting said ore with said strongly acidic cation exchange resin in the presence of an aqueous solution containing from about 10 to about 80 percent by weight of an acid selected from the group consisting of acetic and propionic acids.

6. In a method of recovering lithium values from lepidolite ore which includes contacting the solid ore, in the presence of water while maintaining a temperature of from about 90 to about 150 degrees centigrade, with a strongly acidic cationic exchange resin, subsequently separating the resin from the ore and recovering lithium values from the resin, the improvement which comprises contacting said ore with said strongly acidic cation exchange resin in the presence of an aqueous solution containing from about 10 to about 80 percent by weight of an acid selected from the group consisting of acetic and propionic acids.

7. In a method of recovering lithium values from pollucite ore which includes contacting the solid ore, in the presence of water while maintaining a temperature of from about 90 to about 150 degrees centigrade, with a strongly acidic cationic exchange resin, subsequently separating the resin from the ore and recovering lithium values from the resin, the improvement which comprises contacting said ore with strongly acidic cation exchange resin in the presence of an aqueous solution containing from about 10 to about 80 percent by weight of an acid selected from the group consisting of acetic and propionic acids.

8. In a method of recovering lithium values from beta-spodumene ore which includes contacting the solid ore, in the presence of water while maintaining a temperature of from about 90 to about 150 degrees centigrade, with a strongly acidic cationic exchange resin, subsequently separating the resin from the ore and recovering lithium values from the resin, the improvement which comprises contacting said ore with said strongly acidic cationic exchange resin in the presence of an aqueous solution containing about 30 percent by weight of acetic acid.

9. In a method of recovering lithium values from beta-spodumene ore which includes contacting the solid ore, in the presence of water while maintaining a temperature of from about 90 to about 150 degrees centigrade, with a strongly acidic cationic exchange resin, subsequently separating the resin from the ore and recovering lithium values from the resin, the improvement which comprises contacting said ore with said strongly acidic cationic exchange resin in the presence of an aqueous solution containing about 30 percent by weight propionic acid.

10. A method of recovering lithium values from a lithium-bearing ore containing lithium in an acid-leachable form which comprises, contacting the solid ore, while maintaining a temperature of from about 90 to about 150 degrees centigrade, with an aqueous solution containing from about 10 to about 80 percent by weight of an acid selected from the group consisting of acetic and propionic acids, thereby to dissolve lithium ion from the ore, removing the lithium ion-containing solution from the ore, contacting said solution with a strongly acidic cation exchange resin thereby to load the resin with lithium ion from the solution, removing the aqueous acid solution from contact with the resin, and recovering lithium values from the resin.

11. A method of recovering lithium values from a lithium-bearing ore containing lithium in an acid-leachable form which comprises, contacting the solid ore, while maintaining a temperature of from about 90 to about 150 degrees centigrade, with an aqueous solution containing from about 20 to about 60 percent by weight of an acid selected from the group consisting of acetic and propionic acids, thereby to dissolve lithium ion from the ore, removing the lithium ion-containing solution from the ore, contacting said solution with a strongly acidic cation exchange resin thereby to load the resin with lithium ion from the solution, removing the aqueous acid solution from contact with the resin, and recovering lithium values from the resin.

12. A method of recovering lithium values from a lithium-bearing ore containing lithium in an acid-leachable form which comprises, contacting the solid ore, while maintaining a temperature of from about 90 to about 150 degrees centigrade, with an aqueous solution containing from about 10 to about 80 percent by weight of acetic acid, thereby to dissolve lithium ion from the ore, removing the lithium ion-containing solution from the ore, contacting said solution with a strongly acidic cation exchange resin thereby to load the resin with lithium ion from the solution, removing the aqueous acid solution from contact with the resin, and recovering lithium values from the resin.

13. A method of recovering lithium values from a lithium-bearing ore containing lithium in an acid-leachable form which comprises, contacting the solid ore, while maintaining a temperature of from about 90 to about 150 degrees centigrade, with an aqueous solution containing from about 10 to about 80 percent by weight of propionic acid, thereby to dissolve lithium ion from the ore, removing the lithium ion-containing solution from the ore, contacting said solution with a strongly acidic cation exchange resin thereby to load the resin with lithium ion from the solution, removing the aqueous acid solution from contact with the resin, and recovering lithium values from the resin.

14. A method of recovering lithium values for beta-spodumene ore which comprises, contacting the solid ore, while maintaining a temperature of from about 90 to about 150 degrees centigrade, with an aqueous solution containing from about 10 to about 80 percent by weight of an acid selected from the group consisting of acetic and propionic acids, thereby to dissolve lithium ion from the ore, removing the lithium ion-containing solution from the ore, contacting said solution with a strongly acidic cation exchange resin thereby to load the resin with lithium ion from the solution, removing the aqueous acid solution from contact with the resin, and recovering lithium values from the resin.

15. A method of recovering lithium values from lepidolite ore which comprises, contacting the solid ore, while maintaining a temperature of from about 90 to about 150 degrees centigrade, with an aqueous solution containing from about 10 to about 80 percent by weight of an acid selected from the group consisting of acetic and propionic acids, thereby to dissolve lithium ion from the ore, removing the lithium ion-containing solution from the ore, contacting said solution with a strongly acidic cation exchange resin thereby to load the resin with lithium ion from the solution, removing the aqueous acid solution from contact with the resin, and recovering lithium values from the resin.

16. A method of recovering lithium values from pollucite ore which comprises, contacting the solid ore, while maintaining a temperature of from about 90 to about 150 degrees centigrade, with an aqueous solution containing from about 10 to about 80 percent by weight of an acid selected from the group consisting of acetic and propionic acids, thereby to dissolve lithium ion from the ore, removing the lithium ion-containing solution from the ore, contacting said solution with a strongly acidic cation exchange resin thereby to load the resin with lithium ion from the solution, removing the aqueous acid solution from contact with the resin, and recovering lithium values from the resin.

References Cited by the Examiner
UNITED STATES PATENTS

| | | | |
|---|---|---|---|
| 2,980,498 | 4/1961 | Wheaton et al. | 23—32 |
| 2,980,499 | 4/1961 | Goodenough et al. | 23—32 |
| 3,085,852 | 4/1963 | Peters | 23—32 |

MILTON WEISSMAN, *Primary Examiner.*

H. CARTER, *Assistant Examiner.*